(12) United States Patent  
Kovales et al.

(10) Patent No.: US 8,229,994 B2  
(45) Date of Patent: Jul. 24, 2012

(54) METHOD, SYSTEM, AND PROGRAM PRODUCT FOR PROVIDING AUTOMATIC GROUP SUBSCRIPTIONS

(75) Inventors: Renee M. Kovales, Cary, NC (US); Andrew N. Capella, Cary, NC (US); Mary A. Curran, Apex, NC (US); Haim Schneider, St. Ramot Meir (IL); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1623 days.

(21) Appl. No.: 11/428,914

(22) Filed: Jul. 6, 2006

(65) Prior Publication Data

US 2008/0010334 A1    Jan. 10, 2008

(51) Int. Cl.  
*G06F 15/16* (2006.01)

(52) U.S. Cl. .................. 709/200; 709/203; 709/238

(58) Field of Classification Search .................. None  
See application file for complete search history.

(56) References Cited

U.S. PATENT DOCUMENTS

| | | | |
|---|---|---|---|
| 4,716,524 A * | 12/1987 | Oxley et al. .................. 711/219 |
| 6,178,424 B1 | 1/2001 | Okumura et al. | |
| 6,256,644 B1 * | 7/2001 | Shibayama .................. 707/205 |
| 6,446,114 B1 | 9/2002 | Bulfer et al. | |
| 6,502,093 B1 | 12/2002 | Bhatt et al. | |
| 6,654,746 B1 | 11/2003 | Wong et al. | |
| 2003/0212818 A1 * | 11/2003 | Klein et al. .................. 709/238 |
| 2004/0003048 A1 | 1/2004 | Stillman et al. | |
| 2004/0225717 A1 | 11/2004 | Cuervo | |
| 2005/0071322 A1 | 3/2005 | Chen et al. | |
| 2005/0080551 A1 | 4/2005 | Ledingham et al. | |
| 2006/0036679 A1 * | 2/2006 | Goodman et al. ............ 709/203 |

* cited by examiner

*Primary Examiner* — Olabode Akintola  
*Assistant Examiner* — Kellie Campbell  
(74) *Attorney, Agent, or Firm* — Law Office of Jim Boice

(57) ABSTRACT

A first data store is provided for storing individual subscriptions, including match criteria and an action specification. A second data store is also provided for storing group subscriptions, including a use counter and a list of pointers to the individual subscriptions. When a new individual subscription is submitted, it is registered/stored in the individual subscription data store. Upon registration, its criteria are checked against the criteria of existing subscriptions in the group subscription data store. If there is a match, a use counter corresponding to the matching group subscription is incremented, and a pointer is added to a list of pointers to associate the matching group subscription with the individual subscription. If there is not a match, a new group subscription is added to the group subscription data store, and the group subscription is registered with the pub/sub engine. A use counter corresponding to the group subscription is incremented, and a pointer is added to a list of pointers.

10 Claims, 4 Drawing Sheets

METHOD, SYSTEM, AND PROGRAM PRODUCT FOR PROVIDING AUTOMATIC GROUP SUBSCRIPTIONS

BACKGROUND OF THE INVENTION

1. Field of the Invention

The present invention generally relates to automatic group subscriptions. Specifically, the present invention relates to a method, system, and program product for providing automatic group subscriptions (e.g., for events).

2. Related Art

Existing publication/subscription systems (hereinafter "pub/sub systems") such as Java Message Service (JMS) have limits on the numbers of subscriptions they can support due to memory constraints (Java and Java-based terms are trademarks of Sun Microsystems, Inc. in the United States or other countries). Moreover, as with any system, there are throughput limitations as measured by the number of messages they can deliver per second. Each additional subscription introduces an additional memory requirement and a workload for matching the subscription with published events. These limits greatly affect pub/sub system servers in enterprises and service providers that need to support a large number of individual subscriptions. For example, a user may wish to be notified when the price of a specific stock reaches $10 or when his/her country's team scores a goal in a World Cup soccer match. If a pub/sub system has 100,000 users and each user enters 10 subscriptions, then the pub/sub system has to match events with 1,000,000 subscriptions.

Operators of pub/sub systems attempt to circumvent this by creating groups of users and using one pub/sub subscription for all users with common subscription criteria. However, this creates a burden of work for the operator, who now has to manage the groups.

Another problem with this methodology is that user subscriptions can contain two types of data: subscription criteria and action specification, where the latter specifies user-specific actions to be taken when the users' subscription matches a published event. The IBM Intelligent Notification Services (INS) Subscription Manager is a system that supports action specifications; it is also referred to as an "extended pub/sub" system. In the INS Subscription Manager, a user may specify, for example, to be notified via e-mail for some events, but may wish to be notified via an SMS message or a phone call for events of high importance or high personal interest. When group subscriptions are used with pub/sub systems that support action specifications, the user action specifications would be lost when groups as previously described are used.

Yet another problem with implementing group support outside an extended pub/sub system is that it makes it difficult for an operator to provide a user with a consolidated view to see and manage his/her subscriptions since they are distributed in different parts of the overall system. Furthermore, the operator or administrator who creates the group subscriptions would have to guess as to what subscriptions large numbers of users would want to have. This could be very difficult to do accurately.

In view of the foregoing, there exists a need for a system that overcomes at least one of the deficiencies of the existing art.

SUMMARY OF THE INVENTION

In general, the present invention provides a method, system and program product for providing automatic group subscriptions. Specifically, an individual subscription data store (e.g., a database) is provided for storing individual subscriptions, including match criteria and action specifications. In addition, a group subscription data store (e.g., a database) is provided for storing group subscriptions, a corresponding use counter, and list(s) of pointers to the individual subscriptions. When a new individual subscription is submitted, it is registered/stored in the individual subscription data store. Upon registration, its criteria are checked against any criteria of the existing subscriptions in the group subscription data store. If there is a match (e.g., the criteria are the same), a use counter corresponding to the matching group subscription is incremented, and a pointer is added to a list of pointers to associate the matching group subscription with the individual subscription.

If there is no match, the new subscription criteria accompanying the individual subscription will be registered with a pub/sub engine, and a new entry/group subscription will be created in the group subscription data store. For this new group subscription, a corresponding use counter will be set to 1, and a pointer will be added to a list of pointers to associate the individual subscription with the new group subscription.

When an individual subscription is cancelled/deleted, similar processing will be performed in the reverse: (1) the individual subscription will be removed from the individual subscription data store; (2) the corresponding use counter will be decremented; and (3) the corresponding pointer will be removed. When a use counter for a group subscription reaches zero, it means that there are no longer any individual subscriptions. When this occurs, the group subscription is removed from the group subscription data store and from the pub/sub engine.

When an event is published, an event matching system within the pub/sub system will match the event with group subscriptions (e.g., via event criteria/conditions). For each group subscription match, the system of the present invention will process the list of pointers, and for each corresponding individual subscription, the specific action is taken. This could include passing the event or content related thereto to individual subscribers, or performing some specified action such as performing a computation, launching a program, sending a notification, etc. In this regard, the present invention can execute multiple actions at once.

For some topics, an application designer may know that there will be no common subscription criteria (e.g., email subscriptions) and a parameter can be set to turn off the automatic group processing. This will save the overhead of group processing when there is no need for it while allowing all the users' subscriptions to be stored in the same data store, simplifying the management of user subscriptions. This function can be implemented using any technique known to one of ordinary skill in the art.

A first aspect of the present invention provides a method for providing automatic group subscriptions, comprising: receiving an individual subscription for events, and storing the individual subscription in a first data store; matching, based on matching criteria, the individual subscription with a group subscription contained in a second data store; and when a matching group subscription is identified, incrementing a counter corresponding to the matching group subscription and adding a pointer to a list of pointers, wherein the pointer associates the matching group subscription with the individual subscription.

A second aspect of the present invention provides a system for providing automatic group subscriptions, comprising: an individual subscription system for receiving and storing an individual subscription for events in a first data store; a subscription matching system for matching, based on matching criteria, the individual subscription with a group subscription contained in a second data store; a counter system for incrementing a counter when a matching group subscription is identified; and a pointer system for adding a pointer to a list of pointers when a matching group subscription is identified, wherein the pointer associates the matching group subscription with the individual subscription.

A third aspect of the present invention provides a program product stored a computer readable medium for providing automatic group subscriptions, the program product comprising program code for causing a computer system to perform the following steps: receiving and storing an individual subscription for events in a first data store; matching, based on matching criteria, the individual subscription with a group subscription contained in a second data store; and when a matching group subscription is identified, incrementing a counter corresponding to the matching group subscription and adding a pointer to a list of pointers, wherein the pointer associates the matching group subscription with the individual subscription.

A fourth aspect of the present invention provides a method for deploying an application for providing automatic group subscriptions, comprising: providing a computer infrastructure being operable to: receive and store an individual subscription for events in a first data store; match, based on matching criteria, the individual subscription with a group subscription contained in a second data store; and when a matching group subscription is identified, increment a counter corresponding to the matching group subscription and add a pointer to a list of pointers, wherein the pointer associates the matching group subscription with the individual subscription.

Therefore, the present invention provides a method, system, and program product for providing automatic group subscriptions.

BRIEF DESCRIPTION OF THE DRAWINGS

These and other features of this invention will be more readily understood from the following detailed description of the various aspects of the invention taken in conjunction with the accompanying drawings in which.

Figure 1:
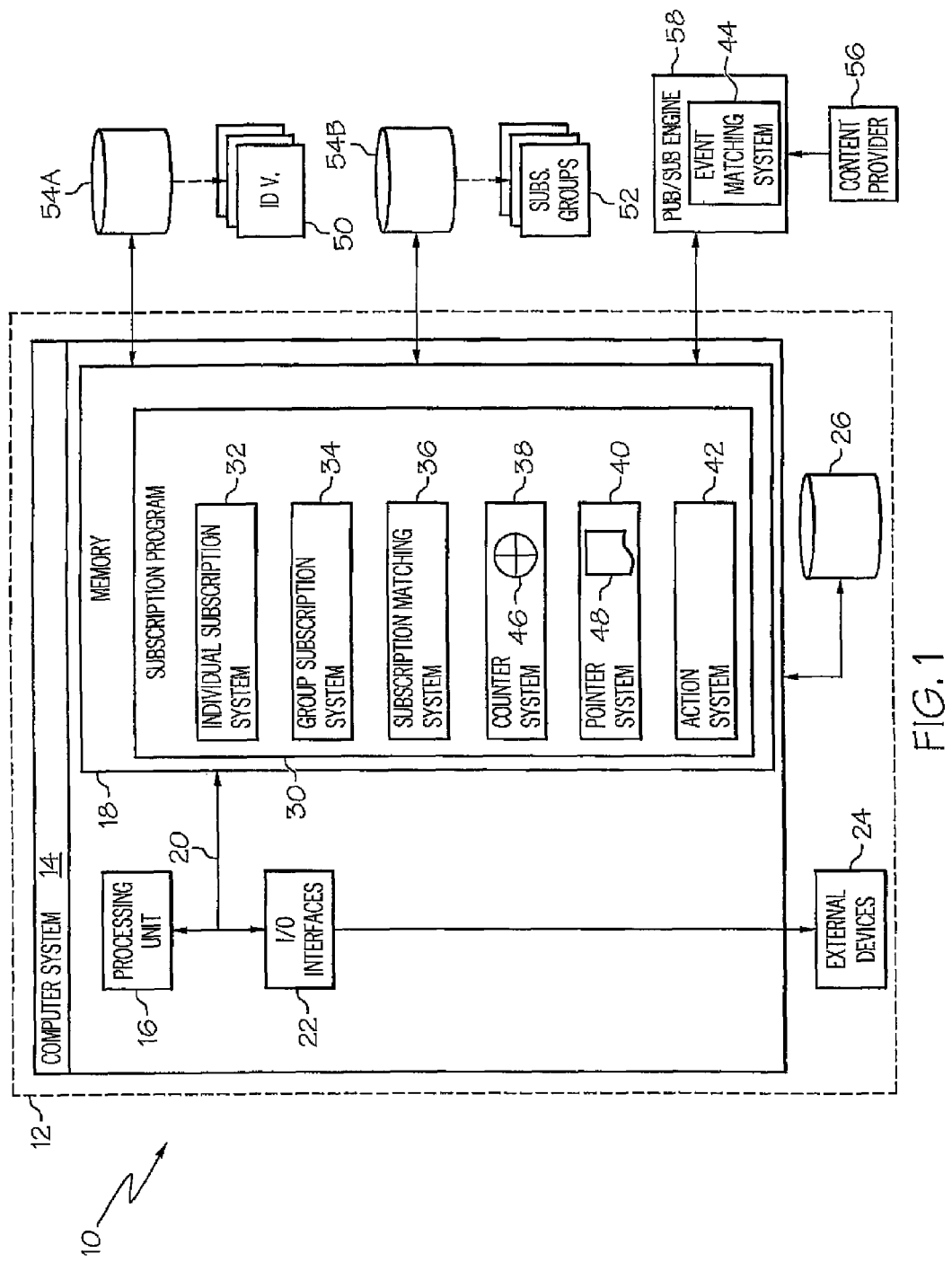
FIG. 1 depicts a system for providing automatic group subscriptions in accordance with the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a dynamic method, system and program product for providing automatic group subscriptions. Specifically, an individual subscription data store is provided for storing individual subscriptions, including match criteria and an action specification. In addition, a group subscription data store is provided for storing group subscriptions, corresponding use counters, and list(s) of pointers to the individual subscriptions. When a new individual subscription is submitted, it is registered/stored in the individual subscription data store. Upon registration, its matching criteria (hereinafter "criteria") are matched against any criteria of an existing group subscription in the group subscription data store. If there is a match (e.g., the criteria are the same), a use counter corresponding to the matching group subscription is incremented, and a pointer is added to a list of pointers to associate the matching group subscription with the individual subscription. It should be understood that the individual subscription data store and the group subscription data store could be separate data storage units, or separate tables in a common data storage unit.

If there is no match, the new subscription criteria accompanying the individual subscription will be registered with a pub/sub engine, and a new entry/group subscription will be created in the group subscription data store. For this new group subscription, a corresponding use counter will be set to 1, and a pointer will be added to a list of pointers to associate the individual subscription with the new group subscription. When an individual subscription is cancelled/deleted, similar processing will be performed in the reverse: (1) the individual subscription will be removed from the individual subscription data store; (2) the corresponding use counter will be decremented; and (3) the corresponding pointer will be removed. When a use counter for a group subscription reaches zero, it means that there are no longer any individual subscriptions. When this occurs, the group subscription is removed from the group subscription data store and from the pub/sub engine.

When an event is published, an event matching system within the pub/sub system will match the event with group subscriptions (e.g., via event criteria/conditions). For each group subscription match, the system of the present invention will process the list of pointers, and for each corresponding individual subscription, the specific action is taken. This could include passing the event or content related thereto to individual subscribers, or performing some specified action such as performing a computation, launching a program, sending a notification, etc. In this regard, the present invention can execute multiple actions at once.

Referring now to FIG. 1, a more detailed diagram of a computerized implementation 10 of the present invention is shown. As depicted, implementation 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to provide automatic group subscriptions according to the present invention. In a typical embodiment, computer system 14 is part of or works in conjunction with a computer infrastructure of an extended pub/sub engine/system.

As shown, computer system 14 includes a processing unit 16, memory 18, a bus 20, and input/output (I/O) interfaces 22.

Further, computer system 14 is shown in communication with external I/O devices/resources 24 and storage system 26. In general, processing unit 16 executes computer program code, such as subscription program 30, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external devices 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or storage system(s) 26 could be contained within computer system 14, not externally as shown.

Storage system 26 can be any type of system (e.g., a database) capable of providing storage for information under the present invention such as event details, etc. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). It should be understood that individual subscription data store 54A and group subscription data store 54B could comprise the same technology as storage system 26. Also, as mentioned above, individual subscription data store 54A and group subscription data store 54B could be separate data storage units (as shown), or stored in a common data storage unit. In addition, although not shown, additional components, such as cache memory, communication systems, system software, etc., may be incorporated into computer system 14.

Shown in memory 18 of computer system 14 is subscription program 30, which includes individual subscription system 32, group subscription system 34, subscription matching system 36, counter system 38, pointer system 40, and action system 42. It should be understood that representation of subscription program 30 is intended only to illustrate one possible way of providing the functionality described herein. As such, the functionality described herein could be represented by a different configuration of systems (e.g., the functions provided by the systems of subscription program 30 could be combined into fewer systems or further separated into additional systems). In addition, although the functionality of the present invention is described herein as being carried out by a single program (e.g., subscription program 30), this need not be the case. For example, multiple different programs could be implemented to achieve the desired function (e.g., subscription program 30 could leverage existing technology in providing its desired results).

Regardless, under the present invention, when an individual or group of individuals (e.g., a department in an organization) wishes to subscribe to an event, an individual subscription 50 will be submitted. In a typical embodiment, individual subscriptions 50 set forth criteria for the type(s) of event(s) in which the corresponding subscriber(s) is interested and also the type of action to take once the event has occurred. The criteria could include items such as a unique identifier and/or location of one or more people, a topic with an optional content-based filtering condition, a news event, a stock price or a combination of items (e.g., the temperature is greater than 70 degrees and rain is not predicted). Along these lines, the action could be as simple as a notification (e.g., via e-mail, or instant messaging), or as complex as automatically scheduling a golf outing since the weather is going to be nice.

Individual subscriptions 50 will be received by individual subscription system 32, and stored in individual subscription data store 54A. Based on the criteria, subscription matching system 36 will attempt to identify at least one matching group subscription 52 from group subscription data store 54B. Specifically, group subscriptions 52 are generally created and stored in group subscription data store 54B by group subscription system 34 in response to one or more individual subscriptions 50. Whenever a group subscription 52 is created, a corresponding use counter and list of pointers can be created as well. These will be described in greater detail below but generally provide: (1) a way to maintain a count of individual subscription(s) 50 to each group; and (2) a way to associate each individual subscription 50 with its corresponding group subscription 52. Further, the newly-created group subscription is registered with pub/sub engine 58 as well.

Based on the criteria provided by individual subscription 50 (e.g., weather and New York City), an appropriate/corresponding group subscription 52 is identified by matching system 36. Specifically, the matching is generally performed by matching the criteria submitted with individual subscription 50 to those stored in group subscription data store 54B. If a matching group subscription 52 cannot be identified, the group subscription system 34 will create a group subscription 52 using the criteria provided and store the same in group subscription data store 54B.

In any event, when a matching group subscription 52 is identified or created for individual subscription 50, counter system 38 will increment a corresponding use counter 46. As mentioned above, each group subscription 52 has a corresponding use counter 46 for tracking a quantity of individual subscriptions 50 for each group subscription 52. In addition, pointer system 40 will add a pointer for the individual subscription 50 to a list of pointers 48. A pointer is a link/association (e.g., utilizing fields of data) between a group subscription 52 (e.g., group "X") and an individual subscription 50 (e.g., individual "Z"). As such, if a group subscription 52 is associated with six individual subscriptions 50 there can be six pointers from the group subscription 52. In general, pointer system 40 can create/maintain a single list that holds all pointers for all group subscriptions, or it can create separate lists (e.g., one for each group subscription 52).

Regardless, when an event occurs, the event or notification thereof will be received by event matching system 44 of pub/sub engine 58, which will match the event with applicable group subscriptions 52. One type of event could be the publication of new content for a particular field/area (e.g., business news) by content provider 56. However, it should be understood that this is only intended as one example of a type of event that could be provided under the present invention. In any event, for each group subscription 52 match, subscription program 30 will be notified/passed the event by event matching system 44 and the corresponding list of pointers 48 will be processed to identify matching individual subscriptions 50.

At this point, action system 42 will handle the event. Specifically, for each individual subscription 50 identified, the specified action(s) is taken (e.g., as set forth in the information provided at registration) by action system 42. Under the present invention, action system 42 is capable of handling the event in multiple ways. For example, action system 42 could: pass/communicate the event (or notification thereof) to subscribers; pass/communicate content to subscribers; or take one or more actions specified by the individual subscriptions 50 such as performing a computation or launching a program as well as sending a notification. For group subscriptions, action system 42 could make only a single action (e.g., communication) for each action (e.g., communication means) set forth by the individual subscriptions 50. Thus, if there were 100 individual subscriptions 50 that matched the event and 25 wanted notification via email, while the other 75 wanted notifications via short messaging, action system 42 could send one email and one short message. This approach would save a significant amount of resources, taking into account that there may be hundreds or thousands of users with the same subscription criteria, and with some or all of the actions being common.

When an individual subscription 50 is cancelled/deleted, processing similar to the subscription will be performed in the reverse. Specifically, individual subscription system 32 will remove the individual subscription 50 from individual subscription data store 54A and counter system 38 will decrement the corresponding use counter 46. In addition, pointer system 40 will remove the corresponding pointer(s) from the list of pointers 48. When a use counter 46 for a group subscription 52 reaches zero, it means that there are no longer any individual subscriptions 50 associated therewith. When this occurs, the group subscription 52 is removed from group subscription data store 54B and pub/sub engine 58.

Figure 2:
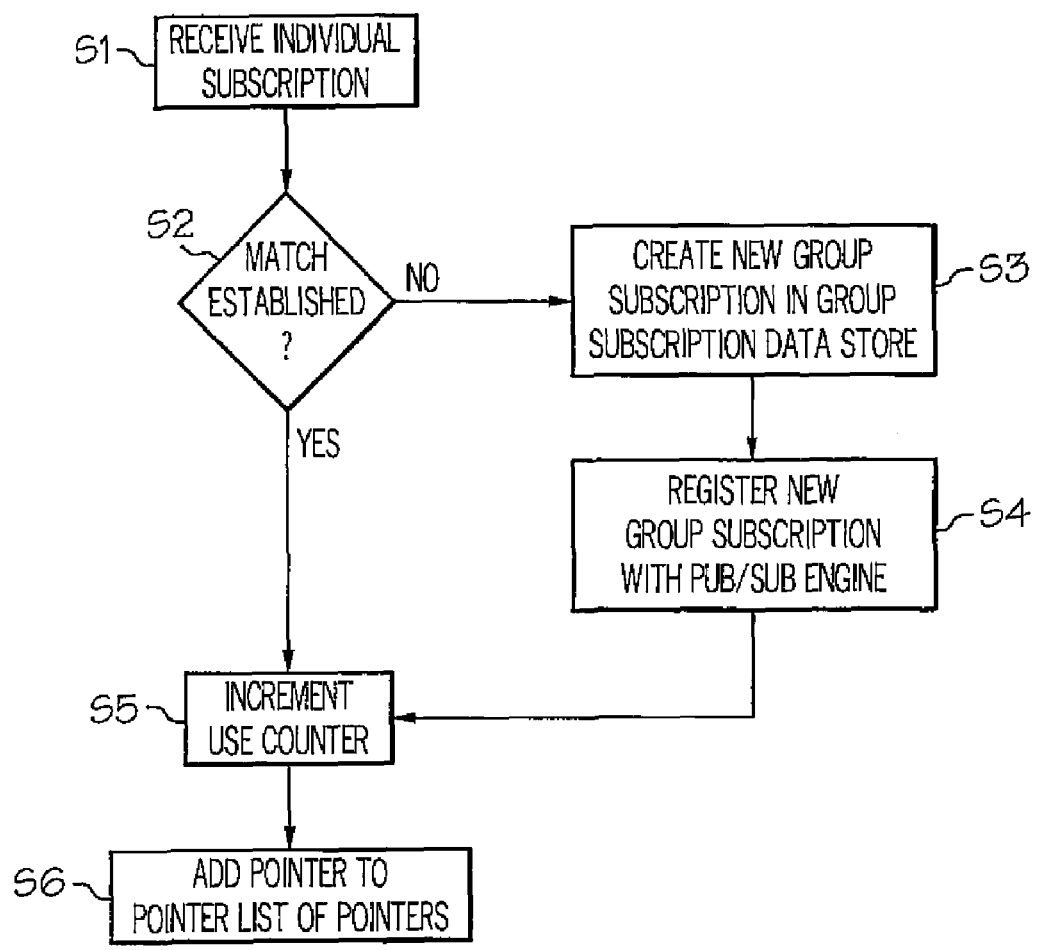
FIG. 2 depicts a method flow diagram of a subscription process in accordance with the present invention.

Referring now to FIG. 2, a method flow diagram of the subscription process of the present invention is shown. As depicted, in first step S1, an individual subscription is received and stored in the individual subscription data store. In step S2, it is determined whether the individual subscription matches a group subscription. This is typically accomplished based upon a comparison of the criteria of the individual subscription to the criteria associated with the group subscription. If a match cannot be established, a new group subscription is created in step S3 according to the criteria set forth by the individual subscription and stored in the group subscription data store. Similarly, the new group subscription is registered with pub/sub engine in step S4. If a matching group subscription is established, a use counter corresponding to the matching group subscription is incremented in step S5, and a pointer is added to a list of pointers in step S6. The pointer officially associates the individual subscription with the group subscription.

Figure 3:
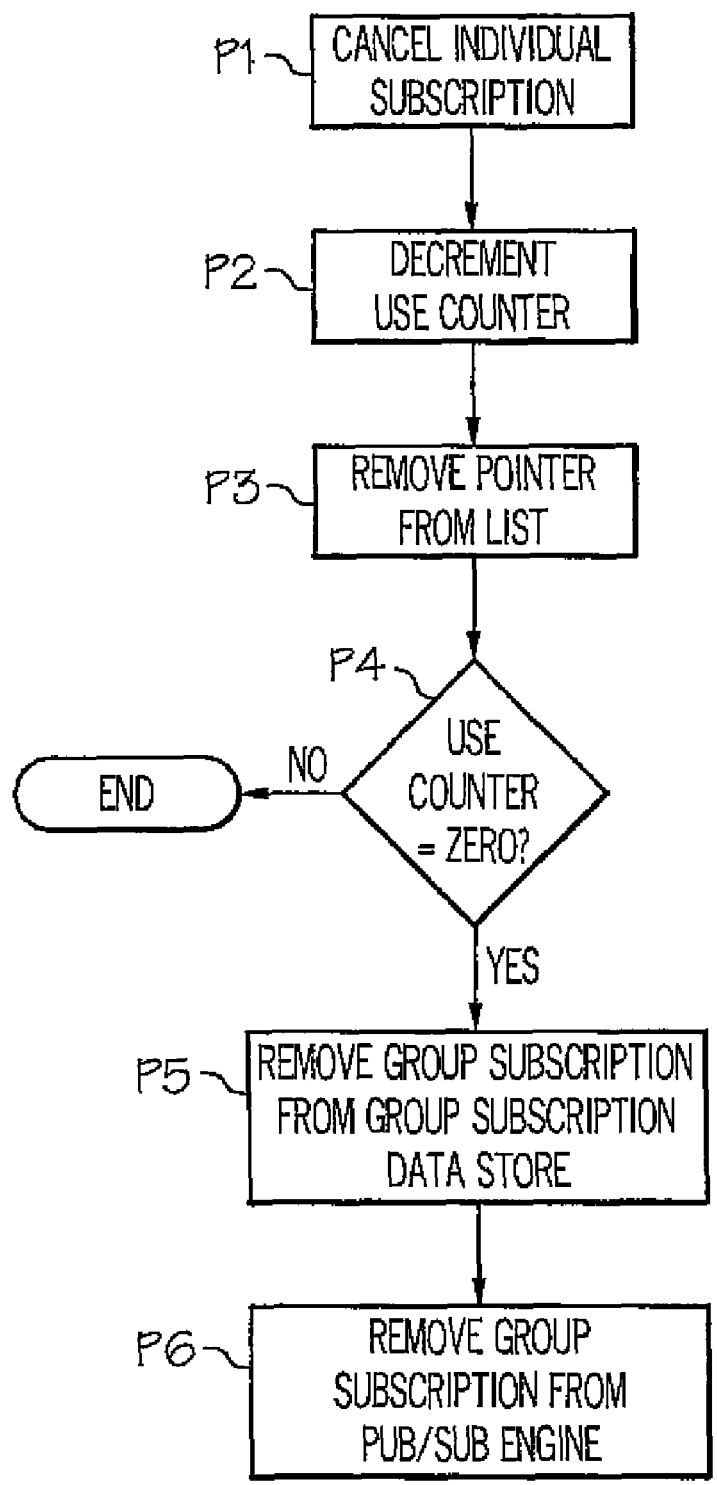
FIG. 3 depicts a method flow diagram of a de-subscription process in accordance with the present invention.

Referring to FIG. 3, a method flow diagram of the de-subscription process of the present invention is shown. Specifically, when an individual subscription is cancelled/deleted, similar processing will be performed in the reverse. As shown, in step P1, an individual subscription is cancelled. In step P2, a corresponding use counter is decremented. In step P3, the corresponding pointer is removed from the list of pointers. In step P4, it is determined whether the use counter for the group subscription has reached zero. If not, the counter and list for the particular group subscription remains and the process will end. If, however, the counter for the group subscription has reached zero, it means that there are no longer any individual subscriptions. When this occurs, the group subscription is removed from the group subscription data store as shown in step P5, and from the pub/sub engine in step P6.

Figure 4:
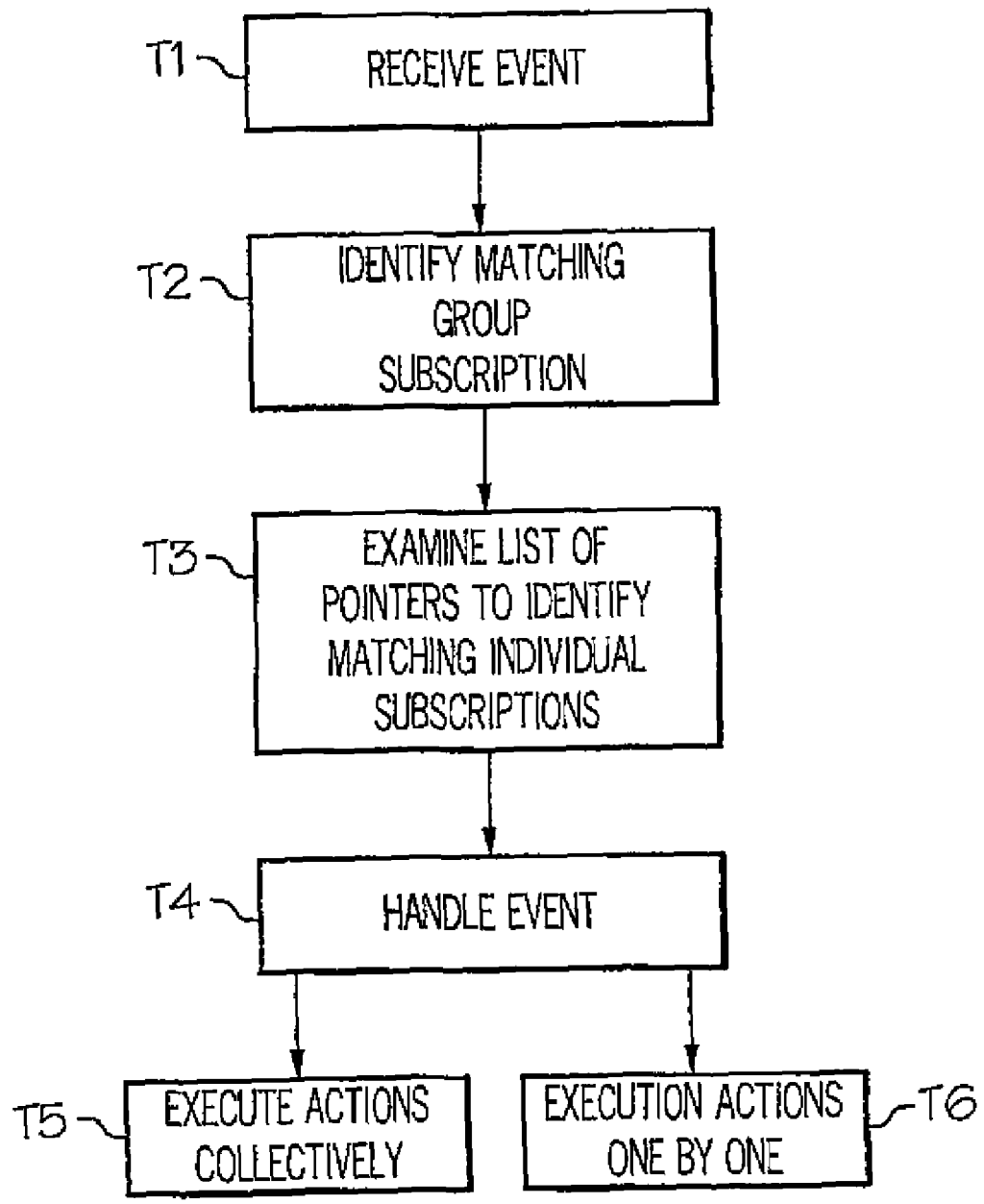
FIG. 4 depicts a method flow diagram of event processing in accordance with the present invention.

Referring now to FIG. 4, a method flow diagram of the event handling process of the present invention is depicted. As shown, in step T1, an event is received. Upon receipt, the event is matched with applicable group subscription(s) in step T2. For each group subscription match, the corresponding list of pointers is processed to identify matching individual subscription(s) as shown in step T3. In step T4, the event is handled as directed by the matching individual subscriptions. As indicated above, the event can be handled in multiple ways. For example, the event (or notification) could be passed/communicated to the applicable subscribers; content corresponding to the event could be passed/communicated to the subscribers; or one or more actions specified by the individual subscriptions could be taken. As shown in step T5, sets of individual actions are carried out together. An example of this would be when information is communicated to individual subscriptions, only a single communication is made for each communication means set forth by the individual subscriptions. In step T6, individual actions that were not carried out with a combined action, are performed one by one.

It should be understood that updates to the various systems/items utilized under the present invention such as pointer system 42, use counter 46, etc., are typically done in a transaction context so that if one step fails, then the entire process could fail. This concept would apply to both the subscribe and un-subscribe processes set forth herein.

While shown and described herein as a dynamic method and system providing automatic group subscriptions, it is understood that the invention further provides various alternative embodiments. For example, in one embodiment, the invention provides a computer-readable/useable medium that includes computer program code to enable a computer infrastructure to provide automatic group subscriptions. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to provide automatic group subscriptions. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing automatic group subscriptions. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method, implemented on at least one computer system, for providing automatic group subscriptions, comprising:
receiving, on at least one computer system, an individual subscription for events, and storing the individual subscription in a first data store;
matching, on the at least one computer system, based on matching criteria, the individual subscription with a group subscription contained in a second data store, wherein the group subscriptions are created in response to one or more similar individual subscriptions;
when a matching group subscription is identified, incrementing a counter corresponding to the matching group subscription and adding a pointer to a list of pointers, wherein the pointer associates the matching group subscription with the individual subscription:
canceling the individual subscription by:
decrementing the counter:
removing the pointer; and
removing the individual subscription from the first data store; and
removing the matching group subscription from the second data store and from a publish and subscribe engine when its counter reaches zero.

2. The method of claim 1, further comprising when the matching group subscription is not identified:
adding a new group subscription in the second data store;
registering the new group subscription with a publish and subscribe engine;
providing and incrementing a new counter that corresponds to the new group subscription; and
providing a pointer to associate the new group subscription with the individual subscription.

3. The method of claim 1, further comprising:
receiving an event;
matching the event with a particular group subscription;
identifying at least one individual subscription for the group subscription using a list of pointers for the group subscription; and
performing at least one action associated with each of the identified individual subscriptions.

4. The method of claim 3, wherein the performing comprises communicating content for each individual subscription associated with the matching group subscription, wherein only a single communication is made for each communication means set forth by the at least one individual subscription.

5. The method of claim 3, wherein the performing, comprises at least one of the following:
performing a single action for a single individual;
performing a single action for multiple individuals; and
performing multiple actions for multiple individuals.

6. A non-transitory computer-readable storage medium with executable program code for providing automatic group subscriptions stored thereon, wherein the program code when executed instructs a computer system to perform the following steps:
receive an individual subscription for events in a first data store;
match, based on matching criteria, the individual subscription with a group subscription contained in a second data store, wherein the group subscriptions are created in response to one or more similar individual subscriptions;
when a matching group subscription is identified, incrementing a counter corresponding to the matching group subscription and adding a pointer to a list of pointers, wherein the pointer associates the matching group subscription with the individual subscription;
decrementing the counter;
removing the pointer:
removing the individual subscription from the first data store; and
removing the matching group subscription from the second data store when its counter reaches zero.

7. The non-transitory computer-readable storage medium of claim 6, wherein incrementing the counter and adding the pointer result in association of the individual subscription to the matching group subscription.

8. The non-transitory computer-readable storage medium of claim 6, further comprising program code for causing the computer system to perform the following steps when the matching group subscription is not identified:

adding a new group subscription in the second data store;
providing and incrementing a new counter that corresponds to the new group subscription; and
providing a pointer to associate the new group subscription with the individual subscription.

9. The non-transitory computer-readable storage medium of claim 6, further comprising program code wherein the program code when executed instructs the computer system to perform the following steps:

receive an event;

identify at least one individual subscription for a group subscription matching the event using a list of pointers corresponding to the group subscription; and handle the event by initiating at least one of a communication means pursuant to the at least one individual subscription.

10. The non-transitory computer-readable storage medium of claim 9, wherein only a single communication is made for each communication means set forth by the at least one individual subscription.

* * * * *